United States Patent
Chen et al.

(10) Patent No.: US 12,170,850 B2
(45) Date of Patent: Dec. 17, 2024

(54) SYSTEMS AND METHODS FOR SHADOW DETECTION AND REDUCTION IN DOCUMENT CAPTURE

(71) Applicant: Adeia Guides Inc., San Jose, CA (US)

(72) Inventors: Tao Chen, Palo Alto, CA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/957,902

(22) Filed: Sep. 30, 2022

(65) Prior Publication Data

US 2024/0114250 A1  Apr. 4, 2024

(51) Int. Cl.
  H04N 23/74 (2023.01)
  G06T 7/00 (2017.01)
  H04N 23/71 (2023.01)

(52) U.S. Cl.
  CPC .......... *H04N 23/74* (2023.01); *G06T 7/0002* (2013.01); *H04N 23/71* (2023.01); *G06T 2207/10152* (2013.01); *G06T 2207/30176* (2013.01)

(58) Field of Classification Search
  CPC ...... H04N 23/74; H04N 23/71; G06T 7/0002; G06T 2207/10152; G06T 2207/30176
  See application file for complete search history.

(56) References Cited

U.S. PATENT DOCUMENTS

| | | | |
|---|---|---|---|
| 9,998,628 B1* | 6/2018 | Palaniyappan | H04N 1/4097 |
| 2009/0028424 A1* | 1/2009 | Sato | H04N 23/70 |
| | | | 382/162 |
| 2019/0266706 A1* | 8/2019 | Mondal | G06T 7/136 |
| 2020/0077005 A1* | 3/2020 | Mondal | H04N 23/74 |

* cited by examiner

*Primary Examiner* — Gevell V Selby
(74) *Attorney, Agent, or Firm* — Haley Guiliano LLP

(57) ABSTRACT

Systems and methods for shadow detection and reduction during document capture are disclosed herein. Temporary images of hardcopy documents are analyzed to determine the presence of a shadow or hotspot that obscures information of the hardcopy document. In response to detecting the shadow or hotspot, a controllable light source is used to illuminate the hardcopy document at predicted and/or predetermined intensities to minimize or eliminate the shadow on the hardcopy document. A permanent image of the hardcopy document illuminated by the controllable light source at the intensity that minimizes or eliminates the shadow is then stored. In this way, information of the hardcopy document (such as text, color, layout, spacing etc.) is increased in the permanent image and a need for post-processing the permanent image is reduced or eliminated.

20 Claims, 4 Drawing Sheets

SYSTEMS AND METHODS FOR SHADOW DETECTION AND REDUCTION IN DOCUMENT CAPTURE

BACKGROUND

The present disclosure relates to systems and methods for enhancing document capture and, more particularly, to systems and methods for detecting and reducing shadows during the process of camera-capturing documents.

SUMMARY

In some approaches document-capture devices, such as copiers, scanners, and other stationary devices, may be used to make digital copies of hardcopy documents. These devices are able to produce high-quality reproductions of hardcopy documents in large part because the capture environment is known and controlled. For example, relations between the hardcopy document, imager, and illuminators are known and consistent between captures, as well as a lack of external variations (such as ambient lighting) affecting the capture environment. However, these devices occupy desk or floorspace, can be costly, and typically sit idle for more time than they are in use.

With the availability of smartphones and advancement of their imaging and processing capabilities, portable devices may use to capture images of documents as a more convenient and less costly method than dedicated document-capture devices. But shadows often appear in photos captured from smartphone cameras when the devices are used in unpredictable lighting conditions (e.g., with multiple and/or variable light sources at inconsistent positions). In one approach, a flash is turned on in response to a user input or determining that the image is not sufficiently exposed. However, this does not alleviate the problem of shadows because the exposure calculation determines features of the overall image instead of shadows or shadow properties. In another approach, a computer attempts to reduce or eliminate the appearance of shadows within the captured images using postprocessing algorithms to digitally process the captured images. This can produce unsatisfactory results because information in the obscured region is lost when the image was captured (e.g., information obscured by the shadow may lack sufficient contrast and be completely indistinguishable), and digital processing may be unable to provide an accurate reproduction of that lost information. These losses are especially apparent when the shadowed region contains colored content, where digital processing results in discordant visual perception of the reproduced colors.

Moreover, the lack of fixed positioning of the capture device, document, and light sources, as well as the open environment, introduce further issues with reflected light (e.g., specular reflection) on higher-sheen documents or other objects that can create "hot spots" in the captured image, which present issues similar to those caused by shadows. These hot spots cause the user to capture and review the document, reposition items, and re-capture the document several times until the proper angle is found to remove the hot spot.

To help address these and other issues, systems and methods are provided that identify shadows and/or hotspots on hardcopy documents and enhance accuracy of the digitized document by dynamically adjusting a controllable light source to determine an optimal illumination intensity prior to capturing a permanent image of the hardcopy document. The permanent image is then captured while the hardcopy document is illuminated at the optimal illumination intensity.

In embodiments, an imaging application utilizing a capture device, such as camera of a mobile device, and a controllable light source minimizes or eliminates a shadow or hotspot on the hardcopy document prior to capturing the document. In some aspects, the imaging application uses temporary or preview images (for example, images stored in volatile memory and optionally displayed to the user) to determine the presence of the shadow on the hardcopy document and dynamically adjusts a light level of the controllable light source, for example, by increasing and/or decreasing the light level to minimize the shadow prior to capturing the document. This solves problems of shadows and/or hotspots on captured images by, for example, optimizing and/or increasing information of the hardcopy document obtained by the captured image.

In some aspects, the imaging application iteratively analyzes temporary images that include the hardcopy document being illuminated at respective different light levels to determine the light level that minimizes the shadow, and captures the hardcopy document while being illuminated at that light level. Examples of determining the shadow has been minimized include determining that the shadow is no longer present on the hardcopy document, that the maximum light level from the controllable light source has been reached, and/or that an increased light level causes loss of other information from the hardcopy document. Further, the imaging application may be adaptive to, for example, the capture device or other hardware such that differences between devices may be obviated by adapting illumination levels, iteration steps, processing algorithms, and/or the like for optimized operation. This solves problems of shadows and/or hotspots on captured images by, for example, decreasing resource requirements (e.g., non-volatile storage and compute) by reducing the number of captured images and/or reducing image post-processing.

In some aspects, the capture device identifies information about a point-source light corresponding to at least a portion of the shadow. The information may include, for example, a light intensity of the point-source light, a position of the point-source light relative to the capture device and/or the hardcopy document, combinations thereof, and the like. The capture device may then use this identified information to minimize the shadow on the document by determining a likelihood that the hardcopy document has a shadow and initialize the controllable light source to a particular level or select a set of light levels for use in minimizing the shadow. The plurality of light levels may be particular subsets of the available light levels for the controllable light source, and members of the subset may be selected and distributed based on the point-source light information. For example, the members may have linear spacing, quadratic spacing, logarithmic spacing, or any other suitable spacing. This solves problems of shadows and/or hotspots on captured images by, for example, expediting the capture process by reducing repetition of steps to capture the document.

In some aspects, the capture device dynamically adjusts the controllable light source to minimize the shadow on the hardcopy document using information about movement of the mobile device. For example, the capture device may determine an optimal light level and/or a predicted light level for controllable light source for each of a set of positions of the mobile device and capture the hardcopy document at the determined light level for the position of the mobile device when the document capture is triggered. This solves problems of shadows and/or hotspots on captured images by, for example, reducing compute required to determine the optimal light level for reducing the shadow/hotspot when capturing the document.

In this way, the systems and methods may reduce storage requirements for document capture; decrease compute requirements by reducing image post-processing; increase battery life by, for example, reduced post-processing and reduced number of document captures; and/or expedite the capture process by reducing repetition of steps to capture the document.

DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1B:
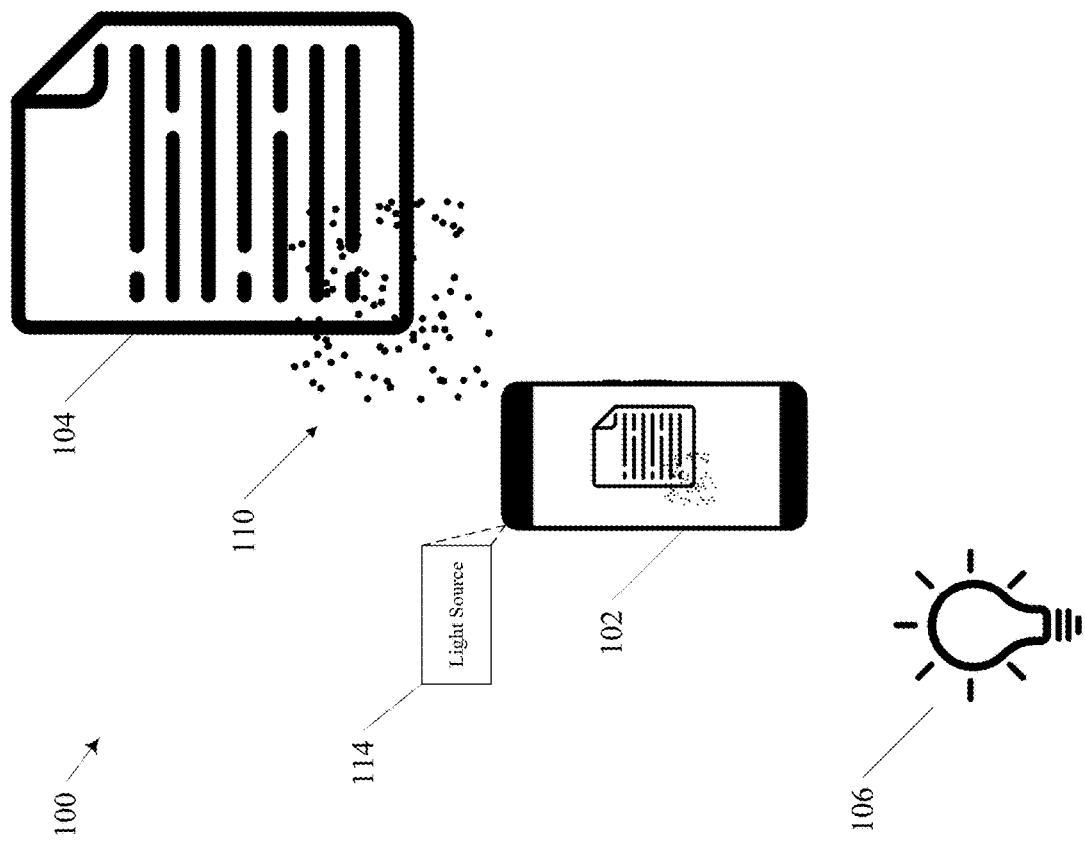
FIG. 1B depicts document capture in a second state within an example environment, according to aspects of the present disclosure.
Figure 1A:
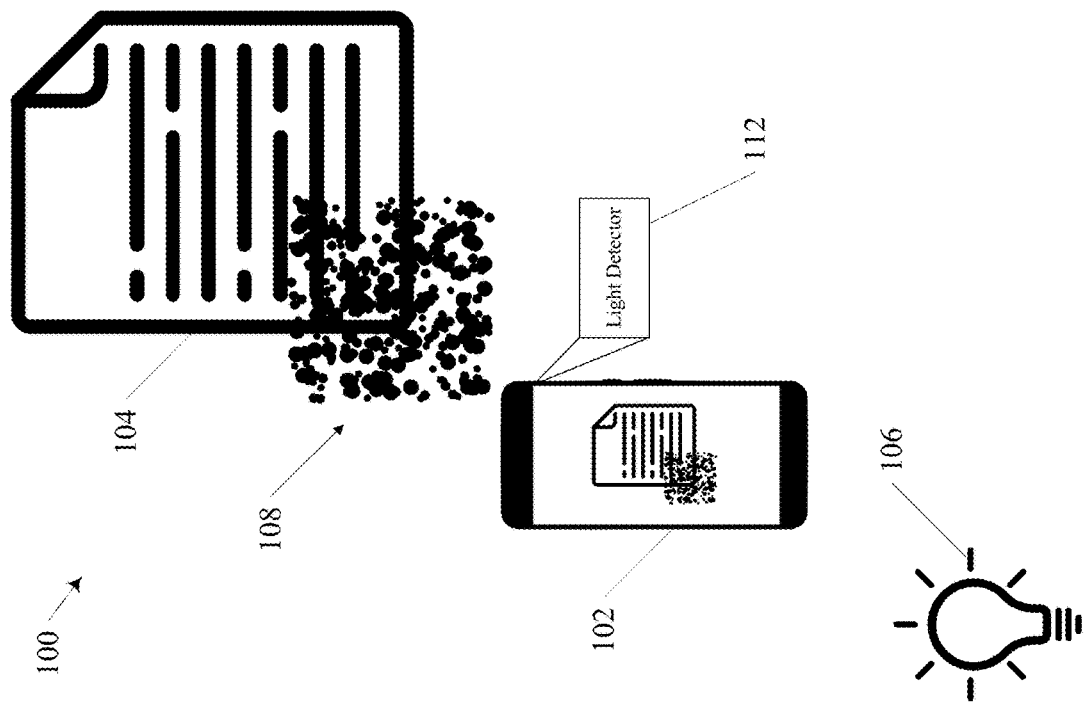
FIG. 1A depicts document capture in a first state within an example environment, according to aspects of the present disclosure.

FIGS. 1A and 1B depict document capture in an example environment 100, according to aspects of the present disclosure. The environment 100 includes an imaging application for capturing hardcopy documents (operating on mobile device 102 as described further below with reference to FIG. 2), a hardcopy document 104, and a point-source light 106. In FIG. 1A, the environment 100 is in an initial state where the hardcopy document 104 has a shadow 108 cast by an object between the hardcopy document 104 and the point-source light 106. In FIG. 1B, the environment 100 is in a subsequent state where the imaging application has produced a reduced shadow 110 on the hardcopy document 104 using the mobile device 102. The imaging application may then capture a permanent image of the hardcopy document 104 with the reduced shadow 110 prior to digitally processing the captured image.

As will be described in detail further below with reference to, for example, FIGS. 3 and 4, the imaging application is configured to reduce the shadow 108 on the hardcopy document 104 using a controllable light source 114 on the mobile device 102 prior to capturing the hardcopy document 104. The imaging application may accomplish this, for example, based on detecting the shadow 108 in a temporary image and dynamically adjusting the controllable light source 114 to different illumination levels until the shadow 108 is reduced or removed from further temporary images. Additionally, or alternatively, as will also be detailed below, the imaging application may use information from other components, such as accelerometers or light detectors 112, or peripheral devices to reduce or remove shadows 108 or hotspots prior to capturing the hardcopy document 104.

Figure 2:
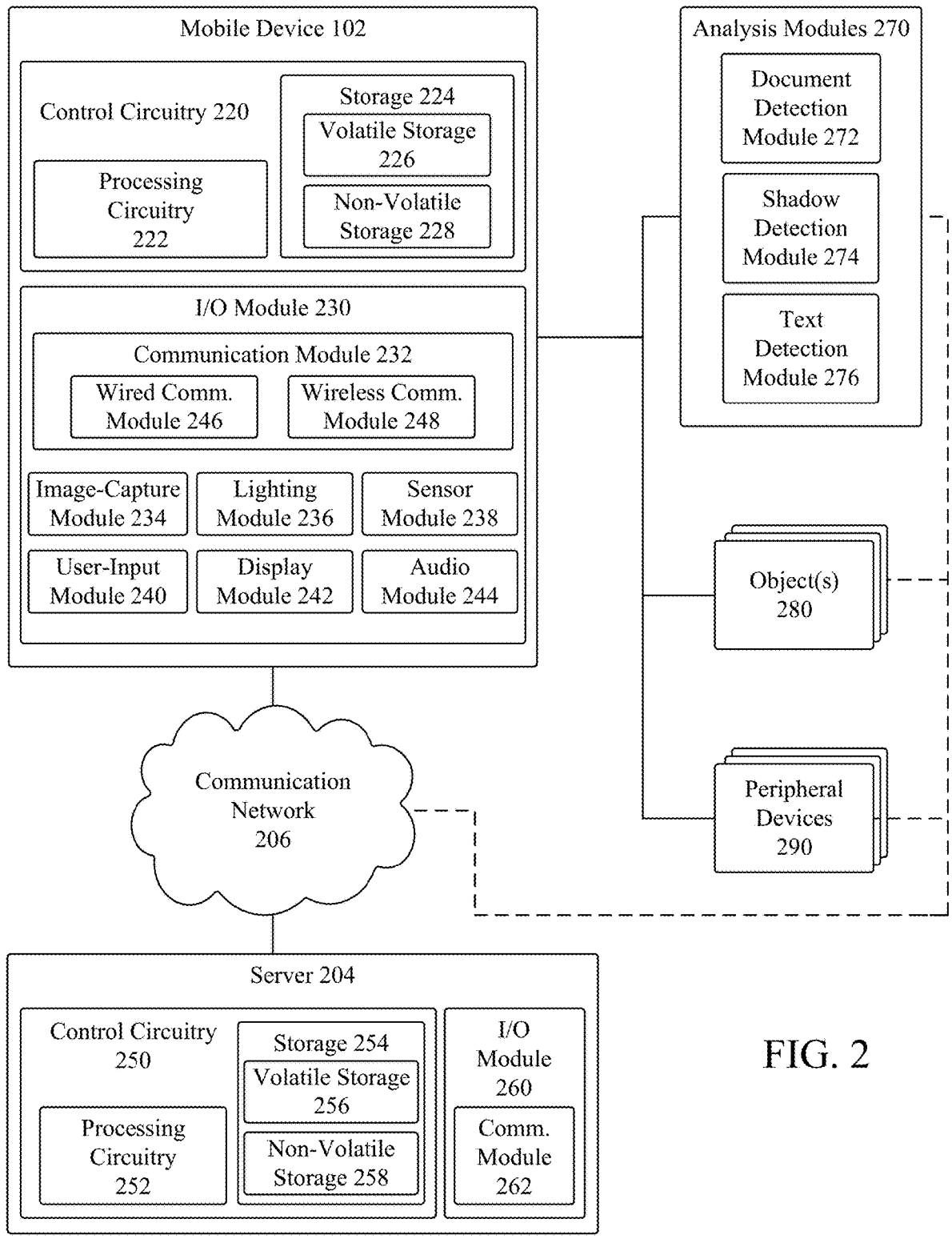
FIG. 2 depicts a schematic illustration of mobile device that may implement an imaging application, according to aspects of the present disclosure.

FIG. 2 depicts a schematic illustration of mobile device 102 that may implement the imaging application, according to aspects of the present disclosure. The mobile device 102 may be, for example a cell phone, PDA, tablet, other handheld device, or the like. The mobile device 102 includes control circuitry 220 and an I/O module 230. While the illustrated example shows the components in a particular configuration, it is recognized that each component of the mobile device 102 may be coupled to any one or more of the other components via an integrated circuit, intermediate components, wire-line and wireless connections, combinations thereof, and the like.

The control circuitry 220 is configured to execute, for example, instructions to control the operation or functioning of at least one other component of the device. The executable instructions may be the imaging application implemented, for example, as software encoded on non-transitory computer-readable media (e.g., a hard drive, random-access memory on a DRAM integrated circuit, read-only memory on a BLU-RAY disk, etc.).

The imaging application may be a stand-alone application implemented on the mobile device 102 or server 204 or a client/server application where a client application resides on mobile device 102 and a server application resides on an external server (e.g., server 204). For example, the imaging application may be implemented partially on control circuitry 220 of the mobile device 102 as a client application and partially on server 204 as a server application running on control circuitry 250.

The control circuitry 220 includes processing circuitry 222 to process the instructions, or components thereof, stored on storage 224. The processing circuitry 222 may control the operation or functioning of the other components either directly or indirectly (e.g., via auxiliary processors). The processing circuitry 222 may include, for example, one or more central processing units, graphics processing units, artificial-intelligence accelerators (e.g., neural processing units and tensor processing units), signal processors (e.g., audio signal processors and image signal processors), physics processing units, field-programmable gate arrays, synergistic processing elements, combinations thereof, and the like.

The storage 224 is configured to store information for use by the processing circuitry 222 or other components. The information may include, for example, programs, raw data, processed data, input data, and output data. In the illustrated example, the storage 224 includes volatile storage 226 and non-volatile storage 228. The volatile storage 226 is configured to store information while the module receives power. In some aspects, the volatile storage 226 may be, for example, cache memory, Random Access Memory (RAM) and sub-types including Static RAM (S-RAM), Dynamic RAM (D-RAM), and Video RAM (V-RAM). The non-volatile storage 228 is configured to store information even when the system is powered off. In some aspects, the non-volatile storage 228 may be, for example, electrically addressed systems (e.g., read-only memory, programmable ROM, and flash memory), mechanically addressed systems (e.g., magnetic tape and disk drives, hard disk drives, and optical disk drives), combinations thereof, and the like.

The I/O module 230 provides for communication or interfacing between the internal environment and the external environment, such as between the mobile device 102 and the environment 100 or external devices. In the illustrated example, the I/O module 230 includes communication module 232, image-capture module 234, lighting module 236, sensor module 238, user-input module 240, display module 242, and audio module 244.

The communication module 232 is configured to facilitate communication of information between the mobile device 102 and external components. For example, the mobile device 102 may communicate with a server 204, which includes control circuitry 250, processing circuitry 252, storage 224 (including volatile storage 256 and non-volatile memory 258), and an I/O module 260 (including communication module 262) that may be similar in form and function to those described above with respect to mobile device 102. The communication between the mobile device 102 and the server 204 may occur via a communication network 206, such as a local area network, wide area network, or the Internet.

The communication module 232 may transmit or receive the information through electrical signals, optical signals, wireless signals, combinations thereof, and the like. The information may include data or computer program instructions. For example, the communication module 232 may transmit data or computer program instructions to be operated on or processed by the external component. Similarly, the communication module 232 may receive signals, such as computer program instructions, to be processed by the processing circuitry 222 or other components of the mobile device 102.

In the illustrated example, the communication module 232 includes a wired communications module 246 and a wireless communication module 248. The wired communications module 246 is configured to communicate signals or messages between the system and external components using hardline connections. The wired communications module 246 may use standards or known protocols for transferring the information, such as USB, HDMI, PCI express, ethernet, RS-232, RS-485, combinations thereof, and the like. The wireless communication module 248 is configured to wirelessly communicate signals or messages between the system and external components. The wireless communication module 248 may use standards or known protocols for transferring the information, such as Wi-Fi, cellular, Bluetooth, radio-frequency identification, Zigbee, combinations thereof, and the like.

The image-capture module 234 is configured to capture a digital representation of external objects (illustrated as objects 280). The image-capture module 234 may be, for example, one or more cameras capable of capturing images, videos, depth data (e.g., time-of-flight or stereoscopic data), combinations thereof, and the like.

The lighting module 236 is configured to provide light at predetermined levels toward objects 280 to be captured by the image-capture module 234. The predetermined levels may be a relative range from, for example, 0 to 1 and have at least one intermediate intensity. For example, the lighting module 236 may include two independently actuatable light sources with each of the independently actuatable light sources having only an ON state and an OFF state provide the device with predetermined points of 0 (none), 0.5 (only one), and 1.0 (both). Additionally, or alternatively, a duty cycle may be implemented where one or more actuatable light sources are cycled at a particular frequency, duration, and/or pattern to produce a desired actual or perceived illumination intensity. In some aspects, the predetermined levels may be distributed through the range in a desired pattern (e.g., four levels distributed linearly, logarithmically, or quadratically). Additionally, or alternatively, the provided light may be infinitely variable to provide any value between 0 and 1 in increments of an arbitrary precision based on capabilities of the device.

The sensor module 238 is configured to detect and/or quantify physical properties, such as properties related to the mobile device 102 or environment 100. The sensor module 238 may be or include a photosensor, temperature sensor, accelerometer, magnetometer, GPS sensor, audio sensor, range sensor (such as SONAR or LIDAR), camera sensor, proximity sensor, pressure sensor, capacitance sensor, inductance sensor, Hall effect sensor, combinations thereof, and the like.

The user-input module 240 is configured to receive input from a user of the mobile device 102. The user input may be through contact with the mobile device 102 or contactless (e.g., capturing an image containing a gesture or detecting proximity of an object) and may be received directly by the mobile device 102 or indirectly through a peripheral device 290.

The display module 242 is configured to present information visually, for example, to a user. In some aspects, the display module 242 includes a display and control circuitry that operates the components of the display in response to signals received from system components. Additionally, or alternatively, the display module 242 may be configured to receive input, for example, from a user via a touchscreen or an integrated sensor. In some aspects, the display module 242 includes sensing circuitry that is configured to determine user interactions or properties, such as a touch, a pressure, a gesture, a sequence of interactions, biometric information, combinations thereof, and the like.

The mobile device 102 may further include or be in communication with one or more analysis modules 270. The analysis module 270 is configured to identify and/or measure properties from input data. In the illustrated example, the analysis module 270 includes a document-detection module 272, a shadow-detection module 274, and a text-detection module 276.

The document-detection module 272 is configured to identify properties of a hardcopy document in a received image. For example, the document-detection module 272 may detect a paper size, a page orientation, a page layout, a position (e.g., an angle to the camera), a color space, a page finish, a relation to other pages (e.g., detecting an order within a group of pages based on adjacent pages in the temporary image, the presence of a fold, or the margins of a page), combinations thereof, and the like.

The shadow-detection module 274 is configured to identify the presence and/or extent of a shadow 108 in a received image. The shadow-detection module 274 may detect the presence of a shadow using one or more methods, such as comparing determined illumination-invariant representations of the temporary image with determined gradients of the temporary image, using context aware analysis (e.g., image-, spatial-, and/or direction-context awareness), combinations thereof, and the like. Additionally, or alternatively, the shadow-detection module 274 may identify the presence and/or extent of a hotspot using similar methods or other known methods.

The text-detection module 276 is configured to identify text and/or characteristics thereof in a received image. The text-detection module 276 may detect the text using one or more suitable methods, such as optical character recognition. The text-detection module 276 may also identify text fields and/or boundaries.

Figure 3:
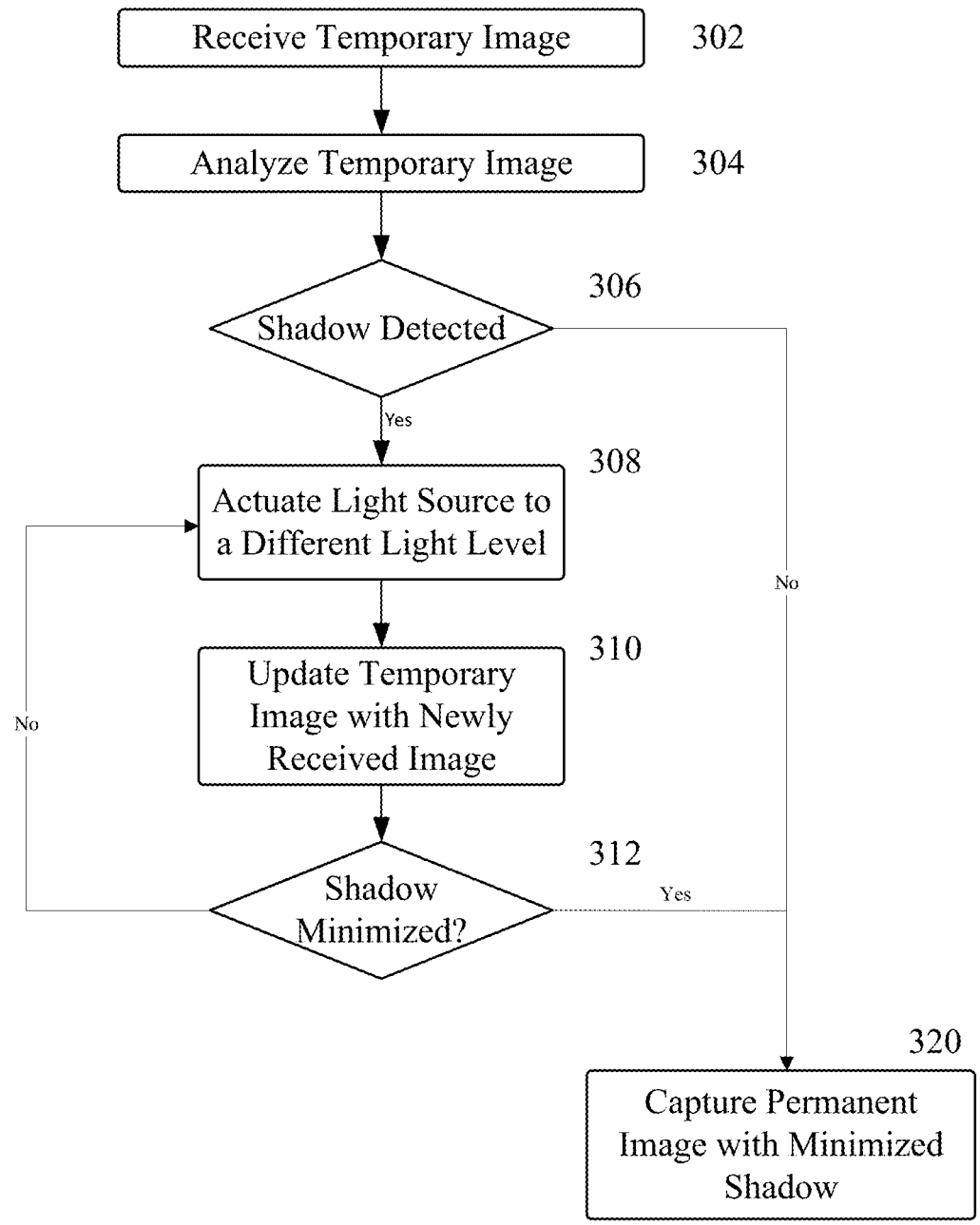
FIG. 3 shows an implementation of capturing an image with a minimized shadow, according to aspects of the present disclosure.

FIG. 3 shows an implementation of capturing an image with a minimized shadow, according to aspects of the present disclosure. For example, the imaging application may cause the mobile device 102 to receive 302 a temporary image. The temporary image may be captured using, for example, the image-capture module 234 and stored in volatile storage 226. The imaging application may then analyze 304 the temporary image using, for example, the shadow-detection module 274 to determine 306 whether a shadow 108 is on the hardcopy document 104 and/or obscures information on the hardcopy document 104.

In some aspects, the shadow-detection module 274 analyzes only a subset of the temporary image to determine whether a shadow is present, which reduces resource requirements. For example, the subset may be only the portion or portions of the temporary image that include an identified page. Additionally, or alternatively, the shadow-detection module 274 refines detection and/or analysis of the shadow 108 by including portions of the temporary image that are proximate to the identified page or to an identified shadow 108 on the identified page in the subset. For example, the shadow-detection module 274 may analyze only the portion of the temporary image corresponding to the identified page and detect the presence of a shadow at the lower left corner of the identified page. In response, the shadow-detection module 274 may expand the subset of the temporary image (e.g., by digitally or optically zooming out) to include an area around the lower left portion of the identified page (e.g., a background such as the desk on which the hardcopy document 104 is placed or another page of the hardcopy document). Beneficially, this additional area may be used to determine or refine analysis of the shadow 108 on the identified page by including additional data that allow the shadow-detection module 274 to more accurately define shadow properties such as boundaries, contours, and sharpness/softness gradients across the shadow using, for example, additional continuity information.

In some aspects, the text-detection module 276 may identify information related to the text (such as characters, words, language, fields, boundaries, and/or characteristics thereof) and then determine whether the shadow 108 covers or is likely to cover unknown text, which allows the imaging application to reduce resource requirements. For example, if the shadow 108 falls within an identified field boundary (e.g., falling in the text field defined by either known or probable margins), the imaging application may continue to reduce the shadow 108. But, if the shadow 108 falls outside of text boundaries (e.g., within an unpopulated margin of a page), the imaging application may capture an image of the hardcopy document 104 at the concurrent illumination.

Additionally, or alternatively, the text-detection module 276 may identify specific text within the boundaries of the shadow 108. The identified text may be analyzed to determine whether the shadow covers or is likely to cover unknown text. For example, the imaging application may use features of the text, such as larger-than-expected spacing between identified characters, unknown or unexpected characters, unexpected grammatical or syntactic structures, unexpected character sizing, and the like, as indicia that unknown text is covered or is likely to be covered by the shadow 108. In response, the imaging application may change the illumination of the hardcopy document 104 by the controllable light source 114. Additionally, or alternatively, in response to determining that unknown text is not covered or is unlikely to be covered by the shadow 108, the imaging application may capture the hardcopy document 104 at the concurrent illumination. The captured image may be processed to remove the shadow 108 without losing any information from the hardcopy document 104.

It is contemplated that other analysis modules 270 may be used to reduce resource usage by determining whether the shadow 108 is obscuring pertinent or needed information and, in response to determining that the information is not obscured or is unlikely to be obscured, capture an image of the hardcopy document 104 at the concurrent illumination. For example, in response to determining that the hardcopy document 104 follows a form template and that the shadow 108 does not cover Tillable or alterable portions of the form template, the imaging application may capture the hardcopy document 104 at the concurrent illumination. The captured image may then be processed to remove the shadow without losing any information by, for example, using the known form template to alter or replace the shadowed portion of the captured image.

The imaging application may continue to reduce the detected shadow 108 by actuating 308 the controllable light source 114 to a different light level than the light level that was used to illuminate the hardcopy document 104 in the analyzed temporary image. For example, the light level of the controllable light source 114 for the subsequent temporary image may be higher than the light level of the controllable light source 114 in the analyzed temporary image.

The imaging application then updates 310 the temporary image with a received temporary image of the hardcopy document 104 that was taken while the hardcopy document 104 was illuminated by the controllable light source 114 at the different light level.

The imaging application analyzes the updated temporary image to determine 312 whether the previously detected shadow 108 has been minimized. For example, the detected shadow may be considered minimized using the above-discussed criteria for the determining 306 or that a comparison of shadows 108 between the prior temporary image and the updated temporary image determines the different light level did not reduce the appearance of the shadow 108. One or more prior temporary images or portions of the prior temporary images may be stored in volatile storage 226 and persist until the occurrence of a predetermined event. The predetermined event may be, for example, collecting another temporary image, collecting a predetermined number of temporary images, qualities of the temporary image meeting predetermined criteria, capture of the digital representation of the hardcopy document 104, combinations thereof, and the like. In response to determining 312 that the shadow 108 has been minimized, the imaging application will capture 320 a permanent image of the hardcopy document 104 with the minimized shadow 108 and, in response to determining 312 that the shadow 108 has not been minimized, the imaging application loops back to actuate 308 the light source to a different light level than previously used and proceeds from there.

Figure 4:
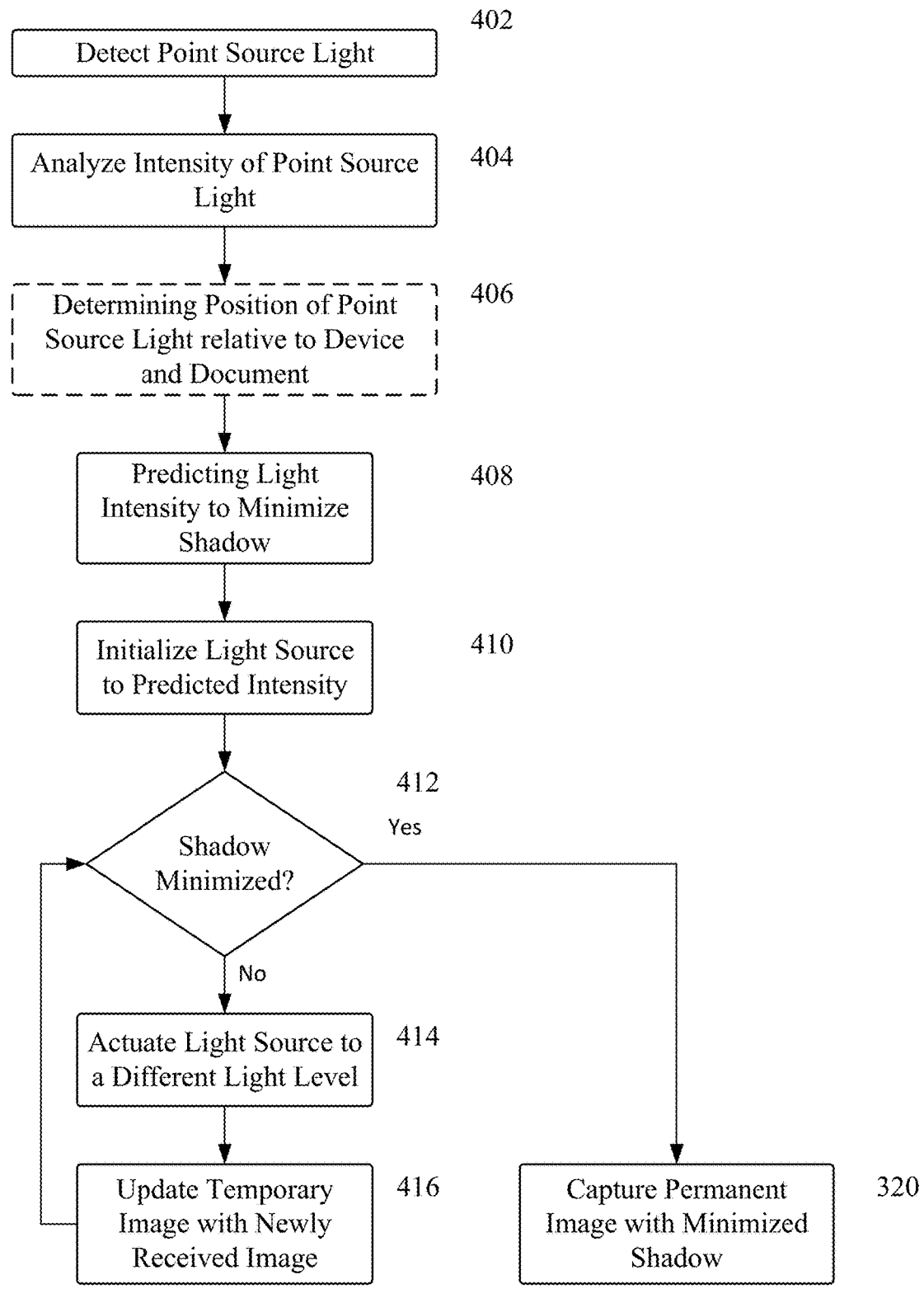
FIG. 4 shows an implementation of capturing an image with a minimized shadow, according to aspects of the present disclosure.

FIG. 4 shows an implementation of capturing an image with a minimized shadow, according to aspects of the present disclosure. For example, the imaging application may cause the mobile device 102 to detect 402 a point-source light 106. The point-source light 106 may be detected using light detector 112 (e.g., at least one sensor module 238 including a photosensor or camera). For example, the presence of a point-source light 106 may be determined by an array of the light detector 112 having an area of pixels with maximum values (e.g., clipping). The view of the light detector 112 may be oriented generally opposite to the view of the image-capture module 234 (e.g., a front-facing camera to detect light and a rear-facing camera to capture images of hardcopy documents).

The imaging application then analyzes properties of the point-source light 106. For example, the imaging application may analyze 404 an intensity of the point-source light 106 received by the light detector 112 (e.g., using pixel values from the array or a size of the maxed out area). Additionally, or alternatively, the imaging application may also analyze properties such as a position of the point-source light 106 relative to the mobile device 102 and/or the hardcopy document 104 (e.g., based on the detected position on the array and/or movement of the detected light corresponding to movement of the mobile device 102).

Further, the light detector 112 (or another sensor module 238 or image-capture module 234) may be used to detect properties of objects 280 between the point-source light 106 and the mobile device 102 to determine whether the objects 280 contribute to a predicted shadow or a detected shadow 108. For example, while the illustrated examples contemplate the mobile device 102 or user casting the shadow 108, other objects 280 may be responsible for casting shadows or reflections on the hardcopy document 104.

The imaging application may then, based on the determined intensity and/or position of the point-source light 106, predict a light intensity for the controllable light source 114 to minimize a predicted shadow or a detected shadow 108 on a hardcopy document 104. The controllable light source 114 is then initialized 410 to illuminate the hardcopy document 104 at the predicted intensity and a temporary image of the hardcopy document 104 is captured and analyzed to determine 412 whether a shadow 108 on the hardcopy document 104 has been minimized. In response to determining that the shadow 108 has been minimized, the imaging application captures 320 a permanent image of the hardcopy document 104. If the imaging application does not determine that the shadow 108 has been minimized, the imaging application then actuates 414 the controllable light source 114 to a different light level, updates 416 the temporary image with an image of the hardcopy document 104 illuminated at the different light level, and analyzes the updated temporary image until it determines 412 that the shadow 108 has been minimized.

In some aspects, the imaging application contemporaneously displays the temporary images to the user via display module 242. The imaging application may track movements of the mobile device 102 by the user or interactions of the user with the mobile device 102 to optimize detection and/or analysis of the shadow on the hardcopy document. In some aspects, the imaging application presents indicia of the shadow, text fields, likely obscured information, or the like to direct user behavior, movement, or interactions to increase information of the hardcopy document 104 that is captured by the permanent image. For example, the imaging application may, in response to determining that the shadowed region includes a colored portion, direct the user to select a similar color occurring on a non-shadowed portion of the hardcopy document 104.

Other operations of the imaging application described herein may be supplemented or refined based on user input. For example, the user may be prompted to confirm determinations, calculations, or other analysis performed by the imaging application. The user may also be prompted or allowed to input initializations of, alterations to, or weights for desired and determined values. For example, the user may input areas of interest on the hardcopy document 104, boundaries for fields or regions, areas of unimportant information, areas of important information, shadow boundaries, undetected shadows within the temporary images, combinations thereof, and the like.

In some aspects, the controllable light source 114 is dynamically adjusted based on position and/or intensity changes of the point-source light 106. For example, the imaging application may track the position of the point-source light 106 relative to the mobile device 102, hardcopy document 104, and/or objects 280 and then increase or decrease the illumination intensity of the controllable light source 114 based on the tracked positions. For example, the imaging application may initially actuate the controllable light source 114 to a first light intensity in response determining that the mobile device 102 and/or user is directly between the point-source light 106 and the hardcopy document 104. The imaging application may then track changes in these positions and, for example, decrease the light intensity in response to determining that the mobile device 102 and/or user are no longer directly between the point-source light 106 and the hardcopy document 104.

In some aspects, the imaging application uses previously determined position and/or intensity data from the capture session to optimize analysis and/or resource allocation during the capture session. For example, the imaging application may use previously determined position data to reduce resource usage by avoiding analyzing temporary images captured under substantially the same conditions (e.g., relative positions of known items are within a predetermined threshold to those items for a prior temporary image). Additionally, or alternatively, analysis of the subsequent temporary image may be refined using data obtained from analysis of the previous temporary images that were captured under known conditions. For example, the imaging application may use position data from a prior temporary image with position data from the subsequent temporary image to initialize, identify, or refine analysis of properties for the shadow 108 in the subsequent temporary image (e.g., shape, contours, gradients, etc. of the shadow or objects 280 responsible for casting the shadow 108). In some aspects, the imaging application corrects colors within a shadowed region of the hardcopy document 104 by using at least one prior temporary image where the region was not shadowed.

The imaging application may also adaptively operate the controllable light source 114. In some aspects, the imaging application adapt selections such as initial light level, minimum step size, step size between iterations, calculations to perform, etc. based on detected hardware or detected calibration and response features. For example, the imaging application may determine absolute values for initial light levels, minimum step sizes, or step sizes between iterations (e.g., measured in lumens), and adapt those absolute values to relative values (e.g., dimensionless or measured from a baseline) for the particular mobile device 102 or particular hardware using obtained or determined information. In some aspects, if a calculated initial value is outside of the absolute maximum light level for the particular device, the imaging application prolongs battery life by avoiding unnecessary calculations and/or iterations during image capture. For example, the imaging application may initialize to the maximum level and avoid multiple iterations or determine other mitigating steps (such as instructing the user to move mobile device 102 closer to the hardcopy document 104). In some aspects, based on the processing efficiency and/or available resources of the mobile device 102, the imaging application selects lower-resource processes, such as iteration and reduced sampling, or higher-resource processes, such as increased calculations and increased sampling.

In some aspects, the imaging application is configured to perform calibrations to determine device properties for use in adaptive selections. For example, the imaging application may test the illumination range, differences in detected illumination versus expected illumination, etc. These calibrations may reduce or remove negative effects of device-to-device variations (e.g., manufacturing differences of otherwise identical devices), component aging (e.g., discoloration of optical or illuminating components), consistent aberrations in images (e.g., non-standard features introduced by a user's protective case), component wear (e.g., scratches to optical components), etc. The calibration and recalibration may occur at regular time intervals, in response to particular events, in response to detected features, in response to determined conditions, etc. For example, the imaging application may automatically recalibrate in response to a predetermined number of charge cycles, a detected battery health, detecting consistent aberrations between images of multiple objects, combinations thereof, and the like.

It is contemplated that additional or alternative analysis modules 270 may be used to further optimize document capture. For example, modules may be included to recognize general document types such as financial statements, receipts, form documents, contracts or other agreements, and schedules or itineraries. Additionally, or alternatively, modules may be included to recognize particular documents, such as those based on known forms or templates. The modules may implement data from previously known environments, logos, seals, signatures, color combinations, and the like to determine the general document types or specific structured information, and imaging application may use information about the identified document type to, for example, define or refine field boundaries or weight importance of information to be captured.

Further, the imaging application may use or optimize identified information of the hardcopy document to enhance utility of the captured image in downstream workflows or trigger workflows or file properties. For example, the imaging application may ensure, in response to determining that the hardcopy document 104 is a receipt, that all information needed to generate an expense report is contained within the captured image prior to storing the image. In response to determining that needed information was not collected, the imaging application may prompt the user to input the information, request user input identifying the location of the information on the hardcopy document in the captured image, direct the user to move the capture device in a known way to capture the information, combinations thereof, and the like.

In some aspects, the imaging application generates the expense report, which may include the stored image, in response to determining that all necessary information was collected. In some aspects, the imaging application is configured to capture other financial documents (e.g., financial statements, utility bills, bank accounts, checks, invoices, etc.) to generate, alter, or supplement planning and forecasting documents, such as budgets or cashflow documents.

In some aspects, the imaging application is configured to select a storage location or other parameters based on information about the hardcopy document 104, such as the document type or information. The imaging application may also enhance privacy and security of the user by encrypting the captured image in response to identifying sensitive information (e.g., personal identifying information, health information, account information, etc.) prior to transferring or storing the captured image, watermarking the image, automatically redacting the sensitive information, adding or altering metadata based on the identified information, performing combinations thereof, and/or the like.

Additionally, or alternatively, in response to determining that expected information is missing, the imaging application may prompt the user to provide, identify, or associate the missing information with the permanent image. For example, the imaging application may prompt the user to identify the missing information by selecting a portion of the temporary or permanent image where the information is present. In another example, the imaging application may prompt the user to provide or otherwise associate the missing information with the temporary or permanent image by manually inputting the missing information or providing an association with external data that identifies the missing information.

After receiving the user input responding to the prompt, the imaging application may then update metadata, stored information, or models such that the unrecognized information may be automatically determined in the future (e.g., an unrecognized brand logo, list format, name, font, language, etc.). In some aspects, the imaging application receives a user selection that identifies a location of the missing information on the hardcopy document 104 and enhances imaging of the selected location until the missing information is determined. For example, the imaging application may dynamically or adaptively adjust the light level illuminating the hardcopy document 104 while emphasizing or weighting the selected area in determining the light level to use when capturing the permanent image of the hardcopy document 104.

In some aspects, the imaging application receives a manual input of the missing information and performs an analysis of the image to optimize automatic identification of the information. For example, the imaging application may dynamically or adaptively adjust the light level illuminating the hardcopy document 104 until the missing information is automatically identified and may, in response, capture an image of the hardcopy document 104 at the respective light level.

Additionally, or alternatively, the imaging application may determine whether the missing information should have been automatically identified and, in response, provide labeled images for tuning existing models and/or training future models. In some aspects, the determination may be made based on the user-input description (e.g., brand name, format name, or font name). For example, if the user-input description indicates that the model should have identified the missing information (e.g., the input is a known brand name), the imaging application may label the image or a portion thereof with at least the corresponding label or labels. In some aspects, the imaging application may determine whether the labeled image may be used to tune or train models. For example, if the imaging application determines that the labeled image exceeds a threshold (e.g., a similarity threshold or a confidence threshold) using existing models, the labeled image may be used to tune the existing models (e.g., when the brand logo is known to the model, but was not recognized because of image quality, unexpected angle or topology, etc.). If the imaging application determines that the labeled image is below the threshold using existing models, the labeled image may be used to train further models (e.g., the brand is known, but have updated or otherwise altered the logo). The application may provide additional labels, such as information about the capture device, lighting module 236, illumination level, mobile device 102, detected properties of the hardcopy document 104, combinations thereof, and the like. In this way, the imaging application may further reduce resources required and expedite future captures.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of enhancing document capture, the method comprising:
   receiving, from a capture device, a first image of a hardcopy document, the first image including a shadow over at least a portion of the hardcopy document;
   detecting a shadow in the first image;
   selecting an intensity level based on a characteristic of the shadow, wherein the intensity level is selected from at least two intensity levels at which a controllable light source is capable of emitting;
   causing the controllable light source, directed at the hardcopy document, to emit light at the intensity level;
   receiving, from the capture device, a second image of the hardcopy document while the hardcopy document is illuminated by the controllable light source emitting the light at the intensity level; and
   storing the second image of the hardcopy document.

2. The method of claim 1, further comprising repeatedly:
   selecting a respective intensity level based on a respective characteristic of a respective shadow;
   causing the controllable light source to emit light at the respective intensity level;
   capturing a respective image of the hardcopy document illuminated at the respective intensity level; and
   determining whether the respective shadow is a minimized shadow,
   wherein, in response to determining the respective shadow is the minimized shadow, the second image of the hardcopy document is the respective image of the hardcopy document or another image of the hardcopy document illuminated at the respective intensity level corresponding to the minimized shadow.

3. The method of claim 2, wherein determining whether the respective shadow is a minimized shadow includes determining that a predetermined level of the light source is a maximum level for the light source or determining that the respective image lacks a detectable shadow when the hardcopy document is illuminated by the light source at the respective intensity level.

4. The method of claim 1, wherein the second image of the hardcopy document is automatically stored in response to determining that the shadow has been minimized.

5. The method of claim 1, wherein storing the second image includes:
   notifying, in response to determining that the shadow has been minimized, a user that the hardcopy document is ready for capture; and
   receiving an input from the user to initiate the storing.

6. The method of claim 1, further comprising, prior to receiving the first image:
   identifying, using a light detector configured to receive light from a direction opposite the capture device, a point-source light;
   determining, based on a light intensity of the point-source light received by the light detector, a predicted shadow characteristic; and
   selecting an initial intensity level of the controllable light source based on the predicted shadow characteristic,
   wherein the first image includes the hardcopy document illuminated by the controllable light source at the initial intensity level.

7. The method of claim 6, further comprising, prior to determining the predicted shadow characteristic, determining a likelihood that the hardcopy document includes a shadow thereon based on a position of the point-source light relative to the hardcopy document,
   wherein determining the predicted shadow characteristic occurs in response to the likelihood that the hardcopy document includes the shadow exceeds a predetermined threshold.

8. The method of claim 7, wherein the capture device is a first camera and the light detector is a second camera.

9. The method of claim 1, wherein the first image is captured at a first resolution and the second image is captured at a second resolution that is higher than the first resolution.

10. The method of claim 1, further comprising tracking movement of the capture device relative to at least one of a point-source light or the hardcopy document, wherein the intensity level of the controllable light source is dynamically adjusted based on the movement of the capture device.

11. A system for enhancing document capture comprising control circuitry configured to:
    receive, from a capture device, a first image of a hardcopy document into volatile storage, the first image including a shadow over at least a portion of the hardcopy document;
    detect a shadow in the first image;
    select an intensity level based on a characteristic of the shadow, wherein the intensity level is selected from at least two intensity levels at which a controllable light source is capable of emitting;
    cause the controllable light source, directed at the hardcopy document, to emit light at the intensity level;
    receive, from the capture device, a second image of the hardcopy document while the hardcopy document is illuminated by the controllable light source emitting the light at the intensity level; and
    store, using non-volatile storage, the second image of the hardcopy document.

12. The system of claim 11, wherein the control circuitry is further configured to repeatedly:
    select a respective intensity level based on a respective characteristic of a respective shadow;
    cause the controllable light source to emit light at the respective intensity level;
    capture a respective image of the hardcopy document illuminated at the respective intensity level; and determine whether the respective shadow is a minimized shadow, wherein, in response to determining the respective shadow is the minimized shadow, the second image of the hardcopy document is the respective image of the hardcopy document or another image of the hardcopy document illuminated at the respective intensity level corresponding to the minimized shadow.

13. The system of claim 12, wherein determining whether the respective shadow is a minimized shadow includes determining that a predetermined level of the light source is a maximum level for the light source or determining that the respective image lacks a detectable shadow when the hardcopy document is illuminated by the light source at the respective intensity level.

14. The system of claim 11, wherein the second image of the hardcopy document is automatically stored using the non-volatile storage in response to determining that the shadow has been minimized.

15. The system of claim 11, wherein storing the second image includes:
notifying, in response to determining that the shadow has been minimized, a user that the hardcopy document is ready for capture; and
receiving an input from the user to initiate the storing.

16. The system of claim 11, wherein the control circuitry is further configured to, prior to receiving the first image:
identify, using a light detector configured to receive light from a direction opposite the capture device, a point-source light;
determine, based on a light intensity of the point-source light received by the light detector, a predicted shadow characteristic; and
select an initial intensity level of the controllable light source based on the predicted shadow characteristic, and
wherein the first image includes the hardcopy document illuminated by the controllable light source at the initial intensity level.

17. The system of claim 16, wherein the control circuitry is further configured to, prior to determining the predicted shadow characteristic, determine a likelihood that the hardcopy document includes a shadow thereon based on a position of the point-source light relative to the hardcopy document, and
wherein determining the predicted shadow characteristic occurs in response to the likelihood that the hardcopy document includes the shadow exceeds a predetermined threshold.

18. The system of claim 17, wherein the capture device is a first camera and the light detector is a second camera.

19. The system of claim 11, wherein the first image is captured at a first resolution and the second image is captured at a second resolution that is higher than the first resolution.

20. The system of claim 11, wherein the control circuitry is further configured to track movement of the capture device relative to at least one of a point-source light or the hardcopy document, and the intensity level of the controllable light source is dynamically adjusted based on the movement of the capture device.

* * * * *